Sept. 16, 1969    W. J. KNOCHEL ET AL    3,467,510
SEALING TECHNIQUE FOR PRODUCING GLASS TO METAL SEALS
Filed Aug. 12, 1966    2 Sheets-Sheet 1

WEIGHT PER CENT $Al_2O_3$

INVENTORS
WILLIAM J. KNOCHEL,
HENRY SKWIRUT &
FRANCIS C.M. LIN
BY
ATTORNEY

United States Patent Office 3,467,510
Patented Sept. 16, 1969

3,467,510
SEALING TECHNIQUE FOR PRODUCING GLASS TO METAL SEALS
William J. Knochel, West Orange, and Henry Skwirut, Verona, N.J., and Francis C. M. Lin, New York, N.Y., assignors to Westinghouse Electric Corporation, Pittsburgh, Pa., a corporation of Pennsylvania
Filed Aug. 12, 1966, Ser. No. 572,058
Int. Cl. C04b *37/02, 37/04*
U.S. Cl. 65—59     5 Claims

ABSTRACT OF THE DISCLOSURE

A firing technique for forming high strength, vacuum tight seals between ceramic bodies and ceramic or metallic end closure members which comprises applying a pre-fired metallic bonding composition principally comprising aluminum oxide and calcium oxide in nearly eutectic proportions to the mating surfaces of the members to be sealed, heating the assembly to approximately 100° C. above the eutectic point of the principal constituents of the metallic oxide sealing composition and holding the assembly at that temperature for approximately 1 minute, then rapidly cooling the assembly at a rate of about 150° C. to 250° C. per minute to approximately 100° C. below the eutectic point of the principal constituents of said composition in from ½ to 1 minute and holding the assembly at that temperature for from 2 to 3 minutes to insure complete solidification of the sealing composition.

---

This invention relates to the sealing of ceramics to ceramics and ceramics to metals and more particularly to an improved method for producing hermetic seals between high alumina content ceramics and refractory metals with metallic oxide sealing compositions.

Substantial effort has been and is being expended in an effort to create consistently reproducible high temperature seals between ceramic elements and other ceramic elements as well as between ceramic elements and metallic elements. Principally these efforts have been directed at providing hermetic seals between high alumina content ceramics and refractory metals. Seals of this nature are extremely important in the production of ceramic-bodied, alkali-metal vapor lamps which perform at relatively high temperatures. Highly effective compositions for producing this type seal are disclosed in the co-pending application Ser. No. 562,016 filed June 30, 1966 by Richard E. Grekila and Shih Ming Ho, William J. Knochel and Francis C. M. Lin and owned by the assignee of the present invention. These compositions have as their principal constituents calcium oxide and aluminum oxide in nearly eutectic proportions along with selected modifying agents which improve the thermal properties and mechanical strength of the seals produced thereby.

It has been found that the firing technique employed in producing hermetic seals between ceramics and ceramics and ceramics and metals can be of critical importance in the consistent production of high quality bonds. Normally the sealing composition is applied to the mating surfaces of the ceramic body and the metal or ceramic end caps used to seal off the ends of the ceramic body member and the entire assembly heated to a selected maximum temperature at which the metallic oxide sealing composition will be in a liquid state. Cooling of the assembly from this maximum temperature has been found to be extremely important with respect to the quality of the final seal. Slow cooling has been found to cause both the devitrification of the glassy sealing composition as well as a decrease in the strength of the bond. On the other hand, cooling at a too rapid rate will exceed the thermal shock level of the ceramic bodies resulting in a cracking of the ceramic member and hence a loss of the intended vacuum seal.

It is, therefore, an object of the present invention to provide a firing technique for metallic oxide sealing compositions which will permit such compositions to form a vacuum tight seal between ceramic bodies and ceramic or metallic closure members which are free from devitrification, contain a glassy phase and are of high strength.

Another object of the present invention is to provide a firing technique which will produce hermetic seals with metallic oxide sealing compositions between ceramic bodies and ceramic or metallic closure members which will avoid cracking or fracture of the ceramic body member due to thermal shock.

A further object of the present invention is to provide a sealing technique for use with metallic oxide sealing compositions in the hermetic sealing of ceramic body members to metal or ceramic closure members which are consistently reproducible.

The foregoing objects are accomplished in accordance with the present invention by employing an improved firing technique to provide a metallic oxide seal between a ceramic body member and a ceramic or metallic closure member. The firing schedule of the present invention involves the heating of an assembly consisting of the ceramic body member and ceramic or metallic closure members having the metallic oxide sealing compositions placed therebetween by first heating the assembly to approximately 100° C. above the eutectic point of the principal constituents of the metallic oxide sealing composition and holding the assembly at that temperature for approximately one minute, then rapidly cooling the assembly to approximately 100° C. below the eutectic point of the principal constituents of said composition in from one-half to one minute and holding the assembly at that temperature for from 2 to 3 minutes to ensure complete solidification of the sealing composition. The assembly is then cooled slowly to a point slightly above the temperature at which the assembly is to operate in its intended environment and annealed at that temperature for from 6 to 20 minutes before the assembly is cooled to room temperature at a comparatively slow rate.

Metallic oxide seals fabricated in accordance with the firing schedule of the present invention have been found to be of high strength and have an improved glassy phase appearance which is indicative of the hermetic quality of the seal.

The above objects as well as many of the attendant advantages of the present invention will become more clearly understood as the following detailed description is considered in connection with the accompanying drawings, in which.

Figure 1:
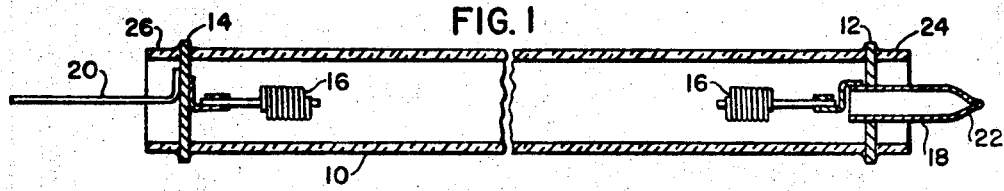
FIGURE 1 is a sectional view of a high temperature metal vapor discharge tube illustrative of one possible use of sealing composition fired in accordance with the present invention.

Although the sealing technique defined by the firing schedule of the present invention may be employed to hermetically seal ceramic containers of many types with ceramic or metal, particularly refractory metal, end caps, one of the principal uses wherein the sealing technique of the present invention has been highly successful is in the sealing of end discs or caps to high-temperature, metal-vapor discharge tubes of the type shown in FIG. 1. The discharge tube illustrated in FIG. 1 generally comprises a body member 10 of high density, sintered, polycrystalline alumina which has sealed thereto and is sealed off at each end by tantalum or niobium discs or caps 12 and 14, preferably of a thickness of about 0.004 to 0.015 inch. Of course, these end discs or caps may be equally as well constructed from a ceramic material such as for example a ceramic having a high alumina content. Secured to the inner surfaces of end discs 12 and 14 are coiled tungsten electrodes 16. Lead-in conductor members 18 and 20 are respectively secured on the exterior surfaces of end caps 12 and 14. Lead-in conductor 18 is in the form of a tantalum or niobium tube which extends through end disc 12 to provide for the evacuation of the interior of the discharge tube and the insertion into the lamp of the discharge sustaining filling. After evacuation and charging of the discharge tube through tubular lead-in conductor 18 it is tipped off by means of squeezing and welding at 22. Alumina backup rings 24 and 26, which are unnecessary when cup-shaped caps are employed instead of the end discs illustrated, are sealed to the outer surfaces of the tantalum or niobium end discs 12 and 14 respectively to aid in the balancing of stresses developed when the disc type end caps are employed. In sealing off the tube of FIG. 1, and for that matter any ceramic container, the mating surfaces between the tube 10 and the end discs and/or caps are coated with a paste-like form of the sealing composition, as for example compositions disclosed in the aforementioned copending application, Ser. No. 562,016. In the illustrated configuration, the annular interior edges of backup rings 24 and 26 are also coated with the paste-like sealing composition. The assembly shown in FIG. 1 is held together during the firing thereof according to the schedule illustrated in FIG. 3 by means of a molybdenum fixture of the type shown in FIG. 2.

The sealing compositions described in said copending application comprise basically a batch mixture of calcium carbonate and aluminum oxide (alumina) in a molar ratio of approximately 2:1 with the addition of from ½ to 10% by weight of a bonding and fluxing additive in fine powder form of one or more of the materials $SiO_2$, BaO, $ZrO_2$, SrO, $Y_2O_3$, $TiO_2$, $ThO_2$ and BeO. The compositions may further include an additional additive to further improve the mechanical bonding strength and the vacuum sealing quality of the metal to alumina seals. These additional additives may include from about ½ to 3% by weight or one or more materials consisting of $Ta_2O_5$, $WO_3$, $Nb_2O_5$ and $Nd_2O_3$ and $V_2O_5$.

Figure 4:
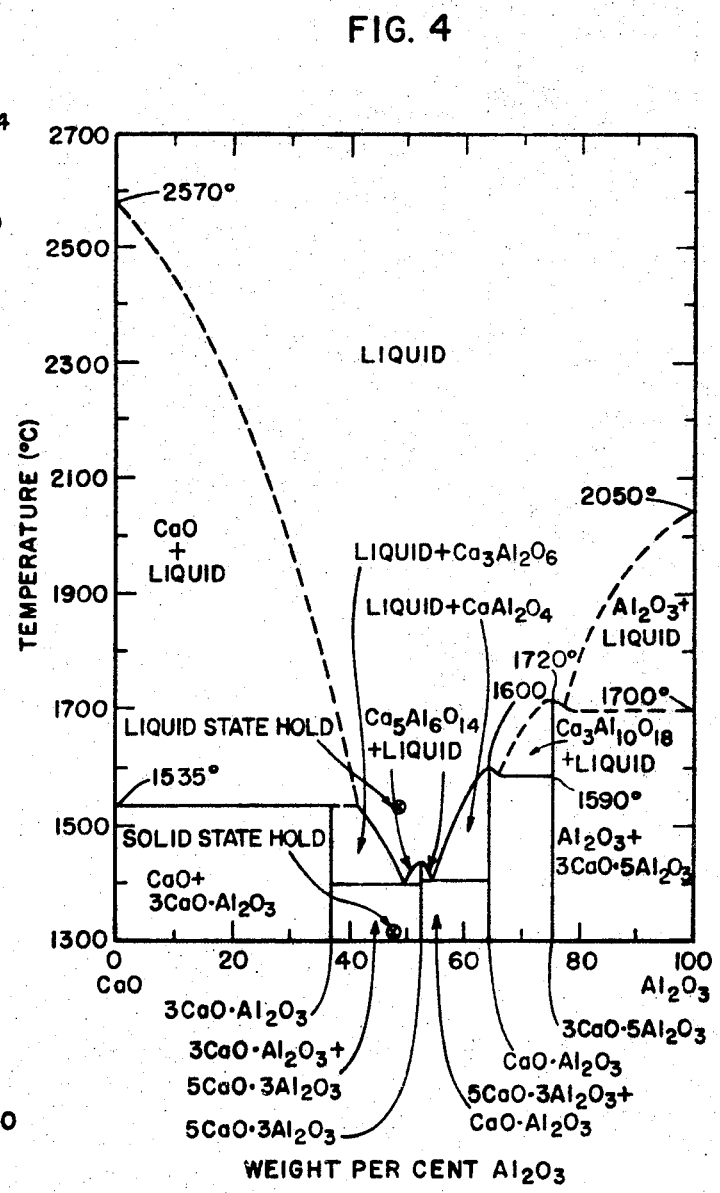
FIG. 4 is a ceramic phase equilibrium diagram of one metallic oxide binary system which may be utilized as the principal constituents of a metallic oxide sealing composition employed in practicing the present invention.

Since the principal constituents of the final sealing composition are calcium oxide and aluminum oxide (alumina), FIG. 4 is provided depicting the phase equilibrium diagram for the calcium oxide, aluminum oxide binary system. The eutectic point of the specified percentages of the metallic oxides making up the binary system of the two principal components is significant to the firing schedule, as will be later described.

Figure 2:
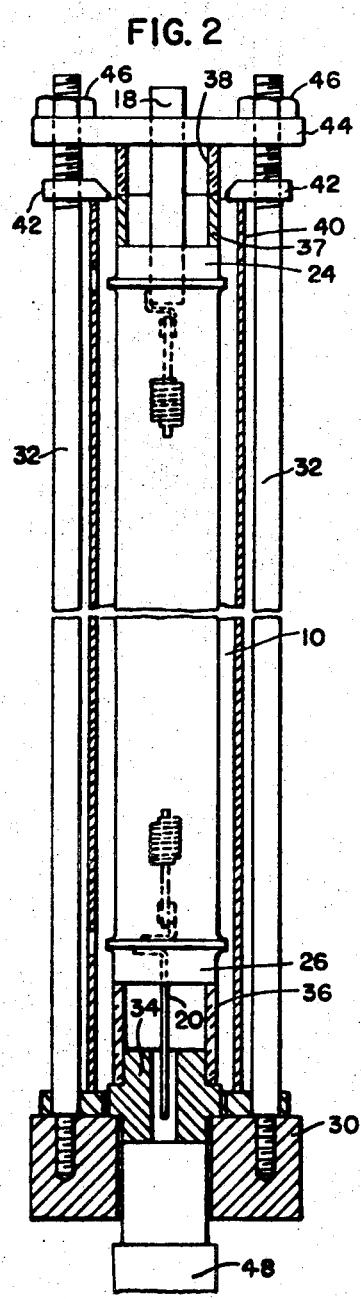
FIG. 2 illustrates a fixture for use in sealing ceramic body members to metal or ceramic end plates in a vacuum furnace.
Figure 3:
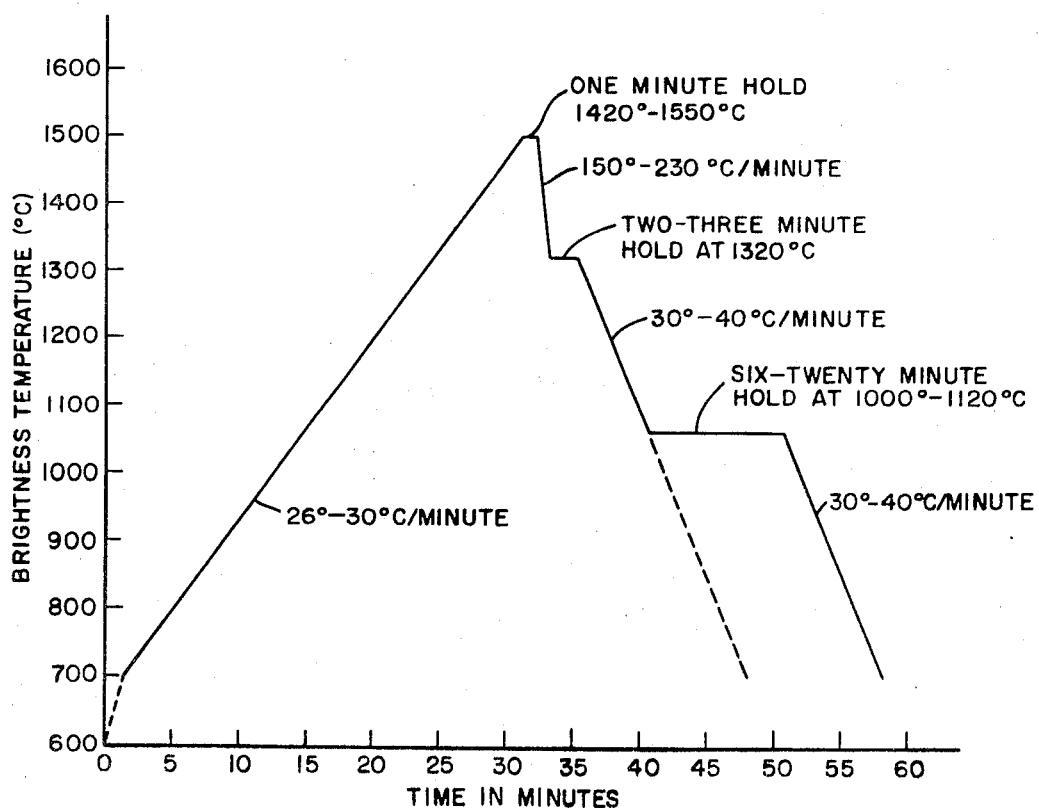
FIG. 3 is a firing schedule diagram illustrating the firing technique of the present invention.

FIG. 2 illustrates a suitable clamping fixture for securing together the various components of the assembly while it is being heated in a vacuum furnace. The clamping fixture, generally comprises a base support member 30 having extending therefrom fixture support rods 32. The base support member 30 additionally carries a centering plug 34, a ceramic spacer 36 is slipped over one end of the centering plug 34 and a joined together assembly is placed on the ceramic spacer. At the other end a metal plug 37 is placed on backup ring 24 to equalize the heat and a second ceramic spacer 38 placed upon the metal plug 37. A tantalum RF susceptor 40 is placed around the assembly and a pair of holding clamps 42 are placed onto support rods 32 to hold the susceptor 40 in place. A fixture head 44 is placed over the support rods and thrust against ceramic spacer 38. A pair of holding nuts 46 for the assembly are then threaded onto the upper ends of the support rods 32 to secure the assembly. The base support of the fixture is then placed on a support rod 48 within an RF coil and the sealing composition, now in dry form on the mating surfaces of the assembly is heated in accordance with the firing schedule of the present invention.

Basically, the present method involves the heating of the assembly at a rate below the thermal shock level of the ceramic body to a temperature approximately 100° C. above the eutectic point of the principal constituents of the sealing composition, holding the assembly at that temperature for about one minute then rapidly cooling the assembly to approximately 100° C. below the eutectic point for the principal constituents of the composition in from one-half to one minute and holding the assembly at that temperature for from two to three minutes to complete the solidification of the sealing composition. The assembly is then relatively slowly cooled to room temperature. Additionally, the cooling cycle can be interrupted at a temperature slightly above the temperature of the environment in which the sealed ceramic body is intended to operate and held at that temperature for from about 6 to 20 minutes in order to anneal the assembly before continuing to cool to room temperature.

More specifically, with reference to the calcium carbonate-aluminum oxide fritted composition above referred to, prepared in accordance with the teachings of the heretofore mentioned copending application Ser. No. 562,016, filed June 30, 1966, and having essentially the phase equilibrium diagram illustrated in FIG. 4, the sealing composition in paste-like form is applied to the mating surfaces of the various elements of the assembly to be sealed together. The assembled discharge tube or ceramic container is placed in the fixture shown in FIG. 2 and the fixture is placed in a vacuum furnace on support rod 48. The assembly is then quickly heated from room temperature to approximately 700° C. If the composition is not of the pre-fritted variety then a degasing period at about 800° C. is necessary. The assembly is then heated from about 700° C. to from about 1420 to 1550° C. at a rate of approximately 26 to 30° C. per minute in the case of a polycrystalline alumina body, which represents between 50 and 125° above the lowest eutectic point on the calcium oxide-alumina oxide binary system phase equilibrium diagram. The assembly is maintained at this temperature for approximately one minute and then quickly cooled to about 1320° C. plus or minus at a rate of from between 150 to 250° C. per minute. This cooling is accomplished in less than one minute and preferably between one-half and one minute. Cooling at slower rates will permit devitrification of the glassy phase of the sealing composition and consequently produce consistently weak seals. Cooling at a too rapid rate to this temperature will often cause cracking of the ceramic envelope or tube. The assembly is retained at a temperature of about 1320° C. for from 2 to 3 minutes to provide for the complete solidification of the sealing composition. The assembly is then cooled at a sustained rate not exceeding 40° C. per minute to a temperature of about 1000 to 1120° C. at which temperature it is annealed for from between 6 to 20 minutes to further relieve residue stresses in the seal which occur due to the different thermal expansion rates of the various elements of the assembly. After the annealing process is completed, cooling of the assembly is again resumed at a rate not exceeding 40° C. per minute until the assembly reaches a temperature of approximately 700° C. at which point the furnace is shut down and the assembly permitted to cool to room temperature.

Although the specific parameters of a sealing composition which principally comprises a binary system of calcium oxide and aluminum oxide has been described in detail, the principles of the present invention are applicable to any ceramic sealing composition which principally comprises a one or more metallic oxides.

With any metallic oxide system the invention may be practiced by assembling the parts with the metallic oxide sealing composition in a paste-like or other suitable form between the mating surfaces of the ceramic and the metal parts to be assembled. The assembly is then heated to approximately 100° C. above the eutectic point for the sealing composition and held at that temperature for approximately one minute to ensure complete melting of the sealing composition. After the hold, the rapid cooling to approximately 100° C. below the eutectic point ensures rapid solidification of the seal and maintaining the assembly at that temperature for a period of about 2 to 3 minutes will ensure total solidification of the entire sealing area and provide for completely hermetic seals of high strength and uniform character which are well suited for high temperature applications of ceramic and metal capsules and more particularly to the sealing of high temperature metallic vapor discharge lamps of the type illustrated in FIG. 1.

As is apparent from the foregoing, the sealing technique of the present invention provides hermetic seals with metallic oxide sealing compositions, between ceramic and ceramic or ceramic and metal members which are free from devitrification, contain a glassy phase, are of high strength, are consistently reproducible and avoid any significant occurrence of cracking of the ceramic members. Furthermore, discharge tubes and other ceramic containers sealed in accordance with these sealing techniques have been found to retain their hermetic characteristics over long periods, i.e. in excess of 3000 hours, while subject to alkali metal vapor atmospheres at temperatures in excess of 1000° C.

We claim:
1. The method of bonding ceramic members to refractory metal members or ceramic members to ceramic members to form a vacuum tight seal comprising the steps of:
   (a) applying a pre-fired metallic bonding composition principally comprising aluminum oxide and calcium oxide in nearly eutectic proportions to the mating surfaces of said members,
   (b) securing the mating surfaces of said members together to form an assembly and placing the assembly in a vacuum atmosphere,
   (c) heating the assembly to a first predetermined temperature of about 100° C. above said eutectic temperature of said bonding composition and maintaining said first predetermined temperature for a predetermined time sufficient to melt said bonding composition,
   (d) rapidly cooling the assembly at a rate of from about 150° C. to 250° C. per minute to a second predetermined temperature of about 100° C. below said eutectic temperature of said bonding composition, and maintaining said second predetermined temperature for a time sufficient to substantially completely solidify said bonding composition, and
   (e) cooling said assembly to room temperature.
2. The method of bonding ceramic members to metal members and ceramic members to ceramic members to form a hermetic seal according to claim 1 wherein the assembly is annealed for from 6 to 20 minutes, at slightly above the temperature at which the assembly is intended for use, during the step of cooling to room temperature.
3. The method according to claim 1 wherein said assembly is heated to said first predetermined temperature of about 1420 to 1550° C. at a rate of approximately 26 to 30° C. per minute and wherein said second predetermined temperature is about 1320° C.
4. The method according to claim 3 wherein said assembly in annealed at a temperature of from about 1000 to 1120° C. during the step of cooling to room temperature.
5. The method of bonding ceramic member to metal members and ceramic members to ceramic members to form a hermetic seal comprising the steps of:
   (a) applying a pre-fired metallic oxide composition principally comprising aluminum oxide and calcium oxide in nearly eutectic proportions to the mating surfaces of said members,
   (b) pre-positioning the members in an assembled relationship and placing the assembly so formed in a vacuum furnace,
   (c) heating the assembly from about 700° C. to from about 1420–1550° C. at a rate of approximately 26–30° C. per minute,
   (d) holding the assembly at a temperature of from about 1420–1550° C. for approximately one minute to permit said composition to completely liquefy,
   (e) cooling the assembly rapidly to about 1320° C. at a rate of from 150–250° C. per minute in less than one minute,
   (f) holding the assembly at approximately 1320° C. for from about two to three minutes to provide for the rapid and complete solidification of the sealing composition,
   (g) cooling the assembly at a rate not exceeding 40° C. per minute to a temperature of from about 1000–1120° C.,
   (h) annealing the sealing composition for from about six to twenty minutes at between 1000 and 1120° C.,
   (i) cooling the assembly at a rate not exceeding 40° C. per minute to about 700° C., and
   (j) shutting down said furnace to permit the assembly to cool to room temperature by radiation.

References Cited

UNITED STATES PATENTS 3,243,635  3/1966  Lomoen et al. _____ 65—59
3,281,309  10/1966  Ross _____ 65—59

S. LEON BASHORE, Primary Examiner
E. R. FREEDMAN, Assistant Examiner

U.S. Cl. X.R.
65—43, 155; 156—89